June 22, 1965  H. J. DIAMOND  3,190,945
METHOD AND MEANS FOR MOLDING CONTOURED
ARTICLES FROM SHEET MATERIAL
Filed Dec. 31, 1962  4 Sheets-Sheet 1

INVENTOR.
HARVEY J. DIAMOND

BY
Channing L. Richards &
Dalbert U. Shefte
ATTORNEYS

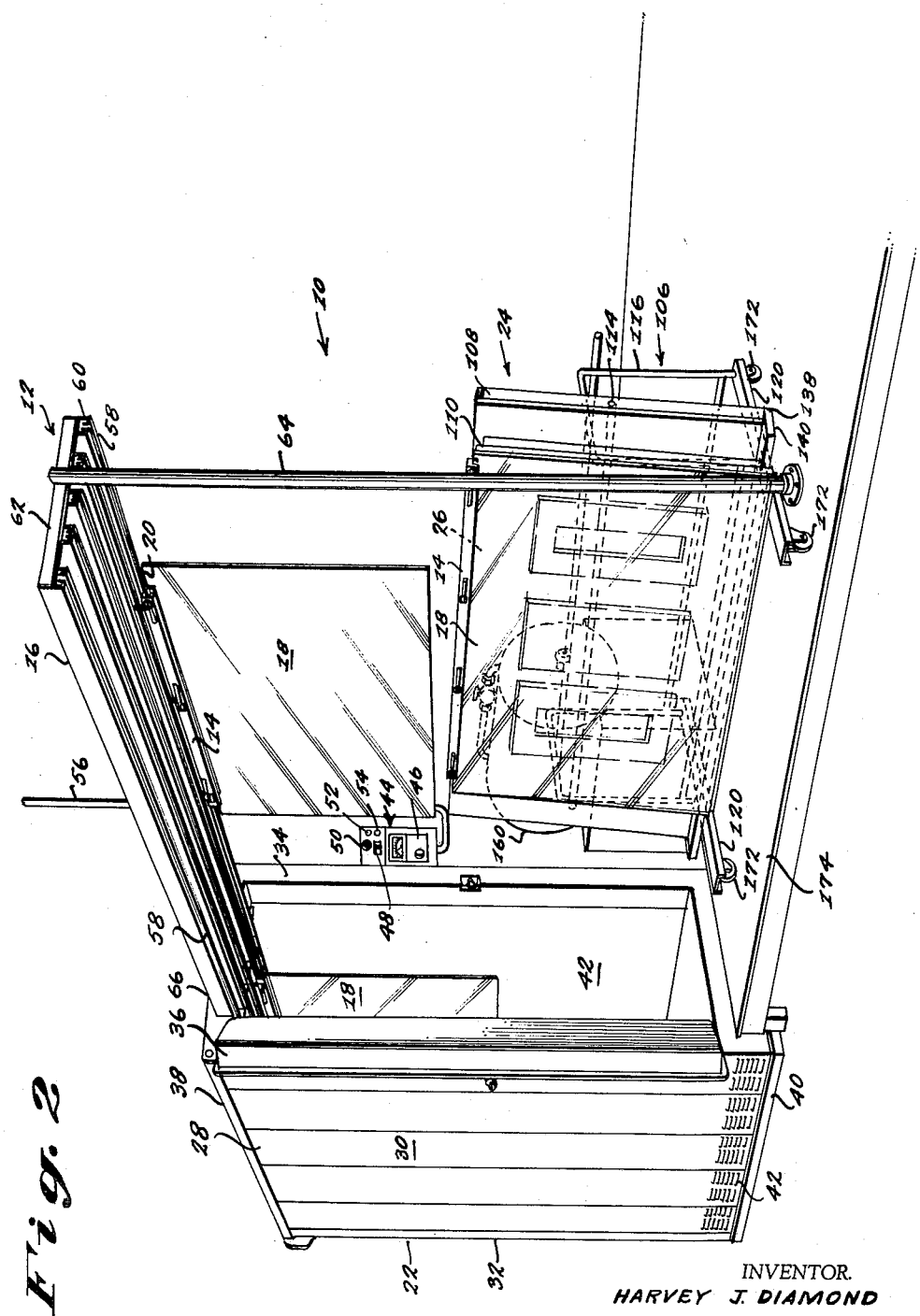

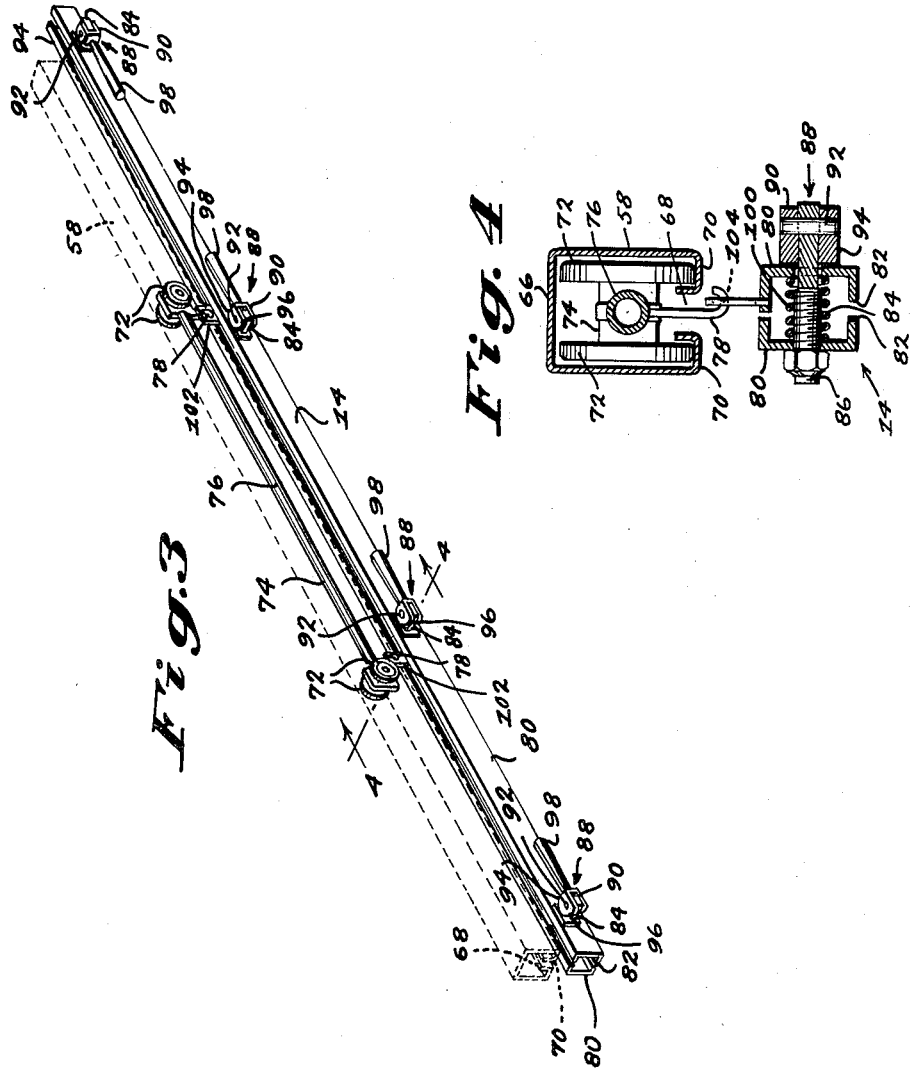

June 22, 1965

H. J. DIAMOND 3,190,945

METHOD AND MEANS FOR MOLDING CONTOURED ARTICLES FROM SHEET MATERIAL

Filed Dec. 31, 1962

INVENTOR.
HARVEY J. DIAMOND
BY
Channing L. Richardson
Dalbert U. Shefte
ATTORNEYS

United States Patent Office 3,190,945
Patented June 22, 1965

3,190,945
METHOD AND MEANS FOR MOLDING CONTOURED ARTICLES FROM SHEET MATERIAL
Harvey J. Diamond, % Plasti-Vac, Inc., 2127 S. Tryon, Charlotte, N.C.
Filed Dec. 31, 1962, Ser. No. 248,814
3 Claims. (Cl. 264—92)

The present invention relates to a method and means for molding contoured articles from sheet material, and more particularly to a method and means for molding contoured articles by heating and forming sheets of material that become plastic when heated, wherein the sheets are handled in an efficient and expeditious manner throughout the processing such that contoured articles are produced from the sheets simply and efficiently without requiring a high degree of skill or care and utilizing compact and inexpensive components, while resulting in a high rate of production.

Briefly described, the method of the present invention provides for suspending a sheet of material to be molded in vertical disposition and heating the sheet to render it plastic while it is so suspended. The heated plastic sheet, while still vertically disposed, is then placed over a substantially inclined face of a mold. Finally, the sheet is formed to the mold contour while being allowed to cool to a rigid state so that upon removal from the mold the sheet will be in the form of a contoured article. The vertical suspension of the sheet during heating allows the sheet to hang freely without being subjected to deformation as it is heated to a degree that renders it plastic and therefore susceptible to deformation, and the placing of the heated sheet, while in its plastic deformable state, over an inclined mold face permits the sheet to be handled and positioned on the mold while still so suspended without manipulation to a horizontal or other changed position that would require substantial care and skill to avoid undesirable deformation. Thus sheets can be simply and efficiently handled by the present invention without a high degree of care or skill where heretofore handling of heated plastic sheets has required delicate and careful manipulation by skilled handlers. As a result, overall efficiency and high productivity are possible by the present invention. In addition, the vertical handling of the sheets reduces substantially the floor space and width of components, such as a heating oven, necessary to accommodate the sheets, so that the physical components for carrying out the method may be compactly arranged and may be of compact and inexpensive construction.

Basically, the means of the present invention comprises a sheet supporting component, a heating component and a mold component. The sheet supporting component is attachable to an edge of a sheet of material to be molded for vertical suspension of the sheet therefrom. This sheet supporting component is positionable in the heating component, which heats the sheet while suspended by the supporting component to render it plastic. Adjacent the heating component is the mold component that has a substantially inclined face arranged for convenient positioning of a heated plastic sheet thereover by positioning the sheet supporting component along the top of the face. This mold component is operable to form the plastic sheet that is placed over the mold face to the mold contour while the sheet cools to a rigid state. With this arrangement of components, sheets are efficiently processed with simple and expeditious handling due to the suspended disposition of the sheets by the sheet supporting component during heating and during placing of the sheets over the mold face. The suspended disposition of the sheets by the structure of the present invention also results in a substantial reduction in the size and cost of components as compared with components that are constructed for handling sheets in flat horizontal disposition.

In a preferred embodiment of the present invention the sheet supporting component comprises a clamp attachable to the edge of the sheet, and an overhead support on which the clamp is removably supported. The overhead support extends into the heating component for movement of the clamp and suspended sheet into the heating component, which is an oven that heats the sheets sufficiently to render them plastic for molding by the mold component to a desired contour.

The clamp of the preferred embodiment of the present invention provides a rigid clamping engagement of the edge of a sheet for a continuous extended length along the edge of the sheet so that the sheet can be suspended from the clamp while rigidly supported along its edge. Thus, the suspended sheet can be handled easily and efficiently simply by handling the clamp. This is of particular importance where, as in the present invention, the sheets may be deformable and extended continuous support reduces the need for great care in handling of the sheets to avoid undesirable deformation. In addition, the present clamp is simply and inexpensively constructed and is readily attachable and detachable even though it is of extended length.

This clamp has a pair of opposed rigid clamping jaws extending continuously for substantially the full length of the sheet to which it is to be attached. A plurality of spaced operating elements are mounted on the jaws and are each operable to clamp the jaws together. Thus, the clamp is simply attached to a sheet by placing the edge of the sheet between the jaws and manipulating each of the operating elements to close the jaws. For removable attachment to the overhead support the clamp is provided with means, such as a pair of spaced eyelets, that are removably engageable with complementary means, such as hooks, depending from the overhead support, which may be a monorail structure with the hooks attached to a carriage that rolls along the monorail from the attaching station to the oven.

The oven is preferably of compact, narrow construction for efficient heating of plastic sheets supported therein. An excellent example of such an oven is disclosed and claimed in copending U.S. patent application Serial No. 526,980, filed February 7, 1963, of which I am a joint inventor.

The mold component of the preferred embodiment is arranged to position a mold face at a substantial inclination so that a sheet of material to be formed by the mold, particularly a sheet that has been heated to render it plastic for forming, can be simply and easily laid over the mold face while vertically suspended, as from a clamp, without requiring delicate handling and substantial skill.

This mold component has a base on which a platform is pivotally mounted, and the platform carries a mold face that is pivotal between a substantially inclined position for receipt of a sheet thereover to a horizontal position at which the sheet is formed to the mold contour by means, such as a vacuum drawn under a perforated mold face. For versatility, the mold face can be formed as part of a removable unit that can be replaced by other units having differently contoured mold faces. Further, the base may be movably mounted to permit movement of the entire mold component, as from a receiving position closely adjacent the oven for expeditious placing of a heated sheet over the mold face while the sheet is still plastic, to a forming position at which the mold component is conveniently out of the way of activity at the oven.

The above mentioned features and advantages, as well as other and further advantages and features, of the present invention will be apparent from the following detailed description and accompanying drawings, in which:

FIG. 2 is a view similar to FIG. 1 showing the components at a different stage in the molding operation;

FIG. 3 is a perspective view of the clamp and supporting carriage of the molding means of FIG. 1, showing in dotted lines the outline of a monorail in which the carriage rides;

FIG. 4 is a vertical sectional view of the clamp and carriage of FIG. 3 taken along line 4—4 of FIG. 3;

Figure 1:
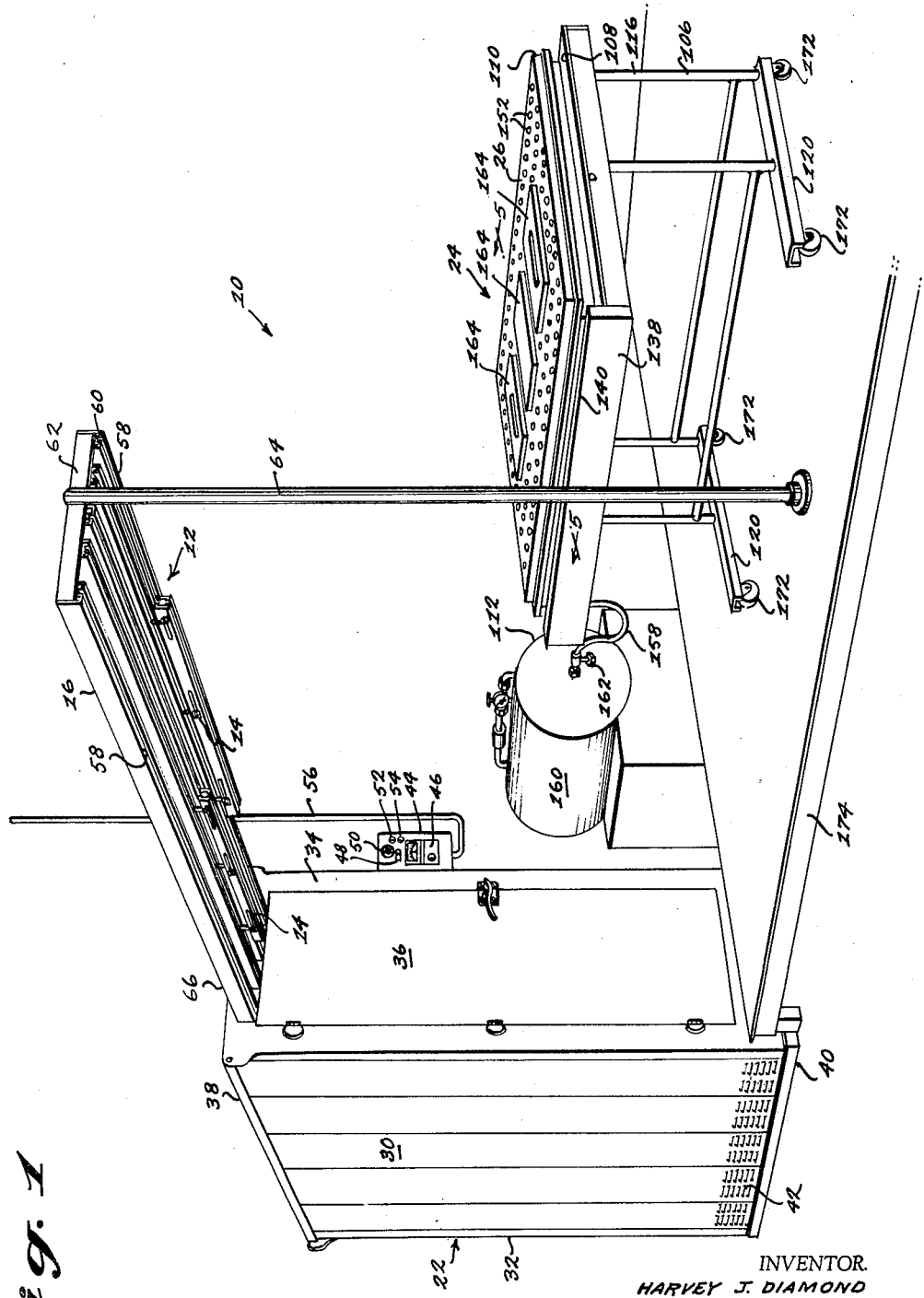
FIG. 1 is an overall perspective view of a preferred embodiment of means for molding according to the present invention.
Figure 5:
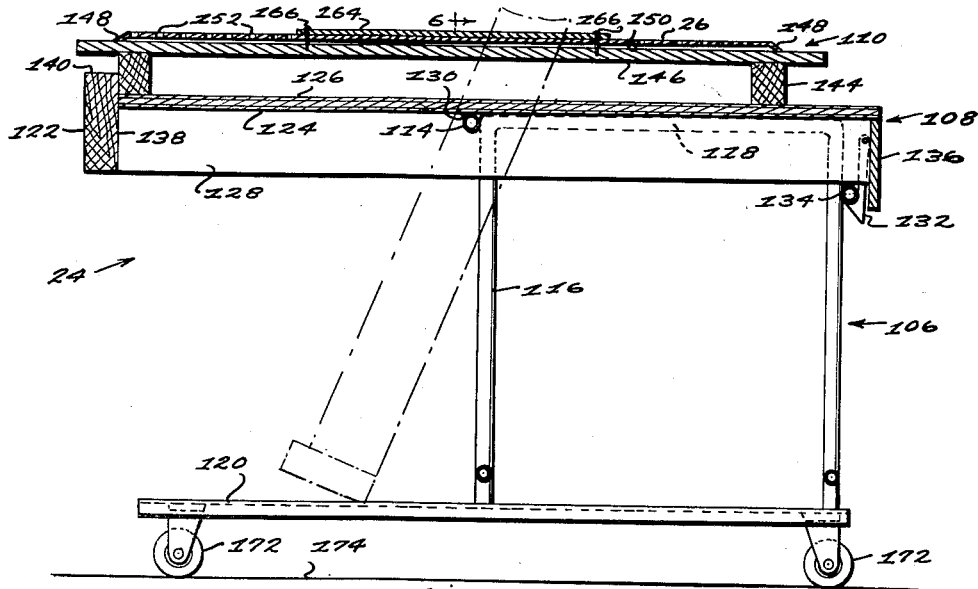
FIG. 5 is a vertical sectional view of the mold component of the molding means of FIG. 1 as viewed in the plane indicated by line 5—5 in FIG. 1.
Figure 6:
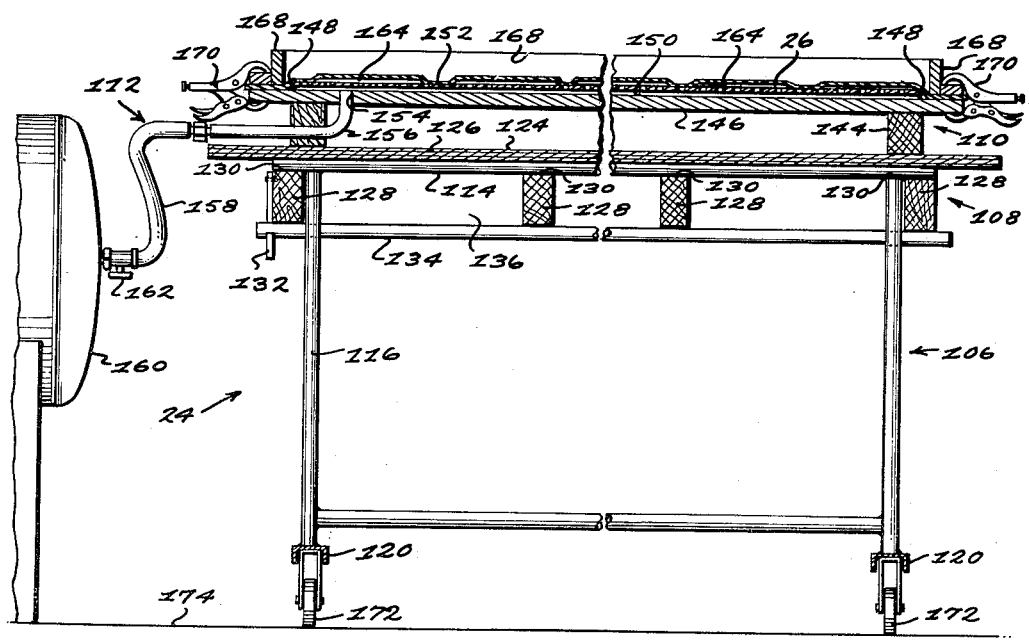
FIG. 6 is a vertical sectional view of the mold component of FIG. 5 taken along line 6—6 of FIG. 5.

The means for molding contoured articles according to the preferred embodiment 10 of the present invention is seen to comprise generally a sheet supporting component 12 consisting of an elongated rigid clamp 14 removably carried by an overhead support 16 so that a sheet 18 of material to be formed may have its edge 20 secured in the clamp 14 for vertical suspension of the sheet therefrom for movement with the clamp along the overhead support 16; a heating component 22 into which the overhead support 16 extends for lengthwise movement of the clamp 14 and sheet 18 suspended therefrom for positioning of the sheet in the heating component 22 for heating to render the sheet plastic for subsequent molding; and a mold component 24 that carries a mold face 26 pivotal between a substantially inclined position (FIG. 2) for receipt of a heated sheet 18 immediately after it is removed from the heating component 22 and a generally horizontal position (FIG. 1) at which the mold component 24 is positioned for operation to draw the heated sheet 18 to the contour of the mold face 26.

In the preferred embodiment, the heating component 22 is an oven in the form of a relatively long and narrow enclosure 28 having hollow sidewalls 30, a rear wall 32, a front wall 34, consisting primarily of a door 36, a top wall 38, and a hollow bottom wall 40 in which a fuel burner (not shown) is provided for heating the interior 42 of the oven by circulation of hot gases through the hollow side walls 30. Air enters the hollow bottom wall 40 through louvers 42 and the spent hot gas is discharged through an exhaust port (not shown) in the top of the side walls.

Operation of the oven 22 is controlled automatically with electrical controls 44 that include an on-and-off switch 48, a thermostat 46 settable to a desired oven temperature, a timer 50 settable to indicate a predetermined heating time, a light 52 indicating that the oven temperature has not reached the thermostat setting and a second light 54 that indicates that the oven temperature has reached the thermostat setting. These controls are connected to the fuel supply controls by electrical wiring carried in the conduit 56.

In the embodiment illustrated, the oven 22 is of a width sufficient to accommodate five rows of vertical suspended sheets, which require very little widthwise space due to the vertical suspension and lengthwise arrangement of the sheets.

Sheets 18 are carried into the oven 22, supported therein during heating, and removed therefrom after heating on the aforementioned sheet supporting component 12, which in the embodiment illustrated comprises a series of five horizontally extending monorails 58 having their outer ends 60 secured to a cross piece 62 of an upstanding outer support post 64. The monorails 58 extend from the support post 64 into the oven 22 and have their top portions 66 secured to the top wall 38 of the oven. Each monorail is channel-shaped, having a central longitudinal bottom slot 68 with inwardly extending guideways 70 on each side of the slot for support of wheels 72 of a carriage 74 positioned within the monorail 58 for movement lengthwise therein. Each carriage 74 consists of two spaced pairs of wheels connected by a tubular body 76 from which spaced hooks 78 extend downwardly through the slot 68 in the monorail 58 for attaching thereto of the aforementioned clamp 14 for movement of the clamp and attached sheet with the carriage 74 along the monorail 58 (see FIGS. 3 and 4).

Each clamp 14 is of an elongated rigid construction for engagement of the sheet 18 to be suspended therefrom. This construction is obtained by the use of a pair of opposing jaws 80 of rigid material extending substantially the full length of the edge of the sheet to be attached in the clamp. In the embodiment illustrated, these jaws 80 are channel-shaped bars having opposing bottom edges 82 for gripping the sheet therebetween. The jaws 80 are operably connected by a plurality of bolts 84 extending laterally through the jaws 80 at spaced intervals lengthwise thereof. Each bolt 84 has a nut 86 threadably secured thereto outwardly of one of the jaws 80 to form a stop. The other end of each bolt 84 has an operating element 88 in the form of a pivoted cam 90 mounted on pivot pin 92 extending through the bolt 84. The cam has a wide portion 94 and a narrow portion 96 and is manipulated by a handle 98 to position either of the portions against the jaw 80. Thus when the handle 98 is manipulated to position the wide portion 94 against the jaw 80 the jaws will be forced together in clamping position, and when the handle 98 is manipulated to position the narrow portion 96 against the jaw 80 the jaws will be permitted to move apart into open position. The jaws are biased apart against the cam 90 by coil springs 100 surrounding the bolts 84 between the opposing jaws 80.

The clamp 14 is removably attachable to the carriage 74 of the monorail structure 58 by a pair of spaced upstanding flanges 102 formed at the top of one of the jaws 80 at a spacing corresponding to the spacing between the hooks 78 depending from the tubular body 76 of the carriage 74. These upstanding flanges 102 have eyelets 104 formed therein for attaching to the hooks 78.

With this clamp construction a sheet 18 of material can be readily attached to the clamp 14 simply by inserting an edge of the sheet between the pair of jaws 80 and manipulating the operating elements 88 to close the jaws against the sheet. The clamp then serves as easy means for handling and supporting the sheet in vertically suspended disposition even after the sheet has been heated and is susceptible of deformation, as when it is removed from the oven 22 and placed on the mold component 24 for forming thereby.

The aforementioned mold component 24, on which heated sheets 18 are placed for forming after they have been rendered plastic in the oven 22, is illustrated in FIGS. 1, 2, 5 and 6. This mold component 24 comprises a base 106 on which a platform 108 carrying a mold unit 110 is pivotally mounted, with operating means 112 connected to the mold unit 110 to form sheets 18 to a desired mold contour.

The base 106 carries a horizontal pivot rod 114 that extends longitudinally along the center line of the platform 108. This pivot rod 114 is secured at the top of an upstanding framework 116 that has horizontal top members 118 extending from the level of the pivot rod 114 transversely thereof under one-half of the platform 108 for support of the platform thereon when the platform is in a horizontal position. The upstanding framework 116 does not extend under the other half of the platform. Thus, the other half of the platform can be pivoted downwardly.

The upstanding framework 116 is mounted on a pair of spaced bottom support members 120 that extend transversely in spaced relation beneath the ends of the platform for substantially the full width thereof. These bottom support members 120 are spaced from the pivot rod 114 by the height of the upstanding framework 116, which space is slightly less than the distance from the pivot rod 114 to the forward extremity 122 of the platform 108 so that when the platform is pivoted from its horizontal position the bottom support members 120 will serve as stops for positioning the platform at a substantial inclination, as shown in FIG. 2 and in dot-dash lines in FIG. 5.

The platform 108 has a flat top portion 124, which presents a flat top surface 126. This flat top portion 124 is secured to depending transverse ribs 128 that are centrally notched at their top surface, as indicated at 130, to form bearings for the pivot pin 114, which extends through the notches 130 under the flat top portion 124.

The platform 108 is releasably retained in its horizontal position by means of a hook member 132 pivotally secured to one of the transverse ribs 128 and depending therefrom for engagement under a stop rod 134 secured to the rear of the upstanding framework 116 and extending longitudinally thereof immediately below the bottoms of the transverse ribs 128. The hook member 132 is arranged so that it can be manually latched under the stop rod 132 to hold the flat top portion 124 against the horizontal top members 118 of the upstanding framework 116 for horizontal positioning of the platform 108, and can be unlatched to permit the platform to be pivoted to the substantial inclination indicated in FIGS. 2 and 5.

The transverse ribs 128 are connected to form a frame for the platform 108 by a rear frame member 136 secured to the rear ends of the ribs and a front frame member 138 secured to the front ends of the ribs.

The front frame member 138 extends upwardly above the plane of the surface 126 of the flat top portion 128 to form a raised portion 140 at the forward extremity 122 of the platform 108. This raised portion 140 serves as a stop for positioning thereagainst the mold unit 110, particularly when the platform 108 is in its inclined position, at which sheets 18 being handled in vertical disposition can be easily placed over the mold face 26 of the mold unit 160 without changing the vertical position of the sheet.

The mold unit 110 is removably positioned on the flat top surface 126 of the platform 108 simply by placing it on the surface, without any other attachment, and positioning it against the raised portion 140 of the front frame member 138. The mold unit 110 has a rectangular frame 144 on which is secured a flat support member 146 on which is secured the mold face 26. This mold face 26 is rigid and has tapered edges 148 that taper downwardly and outwardly so as to position the body of the mold face above the flat support member 146 and thereby form a hollow chamber 150 therebetween.

This hollow chamber 150 serves as a vacuum chamber to draw a sheet 18 to the contour of the mold face 26. To accomplish this vacuum drawing of the sheet to the mold contour, the mold face 26 is perforated, as indicated at 152 and the flat support member 146 is imperforate except for an opening 154 in which a conduit 156 opens for drawing air from the hollow chamber and from between the mold face 26 and the sheet 18, thereby drawing the sheet tightly to the contour of the mold face. The vacuum is drawn through the conduit 156 and through a flexible conduit 158 attached thereto into a vacuum tank 160 having associated therewith a pump (not shown) for drawing air from the tank 160 to create a vacuum therein. A valve 162 is provided at the connection of the flexible conduit 158 to the tank 160 to turn the vacuum on and off as desired.

The contour of the mold may be varied as desired by placing thereon separate mold pieces 164, which may be removably attached by nails 166, glue or other means. Thus a single mold unit 110 may be modified by attaching different mold pieces 164 to obtain a variation of mold contour and configuration. Further, as the mold unit 110 is removable, a plurality of mold units can be utilized with each mold component 24 to provide even greater versatility and to permit modification of one mold unit while another mold unit is in use.

During molding the sheet 18 being molded is secured in place by a peripheral clamping frame 168 that extends around the periphery of the sheet 18 outwardly of the mold face 26 and over the periphery of the flat support member 146. The clamping frame 168 is secured in clamping engagement to position the sheet and to seal the sheet against the flat support member 146 for proper vacuum operation by a plurality of toggle clamps 170 spaced appropriately around the periphery of the mold unit 110.

During the molding operation the platform 108 is pivoted to a horizontal position so that the mold unit 110 will be horizontally disposed for easy attachment of the clamping frame 168 and toggle clamps 170 and for proper positioning of the sheet 18 on the mold face 142 during the molding operation.

In the embodiment illustrated, the mold component 24 is moved between a receiving position, as shown in FIG. 2, and an operating or molding position, as seen in FIG. 1. In the receiving position the platform 108 is at its substantially inclined position adjacent the oven 22 so that sheets 18 coming from the oven can be immediately placed over the mold face 26. The mold component 24 may then be moved back to permit pivoting of the platform 108 to its horizontal position and to permit operators to move around the mold component without interfering with other sheets being handled at the overhead support 16.

Movement of the mold component 24 is provided by four wheels 172 mounted at the ends of the bottom support members 120 of the base 106 of the mold component 24. Movement of the mold component 24 relative to the fixed vacuum tank 160 is accommodated by the flexible conduit 158 connecting the tank to the conduit 156 of the mold unit 110.

As seen in FIGS. 1 and 2, the mold component 24 moves back and forth on a raised flooring 174, which is provided so that the operators will be able to readily handle the sheets 18 and particularly to attach and remove the clamps 14 from the overhead support 16 when the oven and associated overhead support are designed to be sufficiently high for handling long sheets.

In carrying out the method of molding sheets according to the preferred embodiment of the present invention and utilizing the above described means of the preferred embodiment, a sheet 18 to be processed is first attached to a clamp 14 by placing the clamp along the edge 20 of the sheet and then manipulating the handles 98 of the operating elements 88 of the clamp to clamp the jaws 80 against the edge of the sheet. As the jaws 80 extend substantially the full length of the edge 20 of the sheet 18 attached thereto, the sheet can be readily handled in vertical suspension from the clamp without danger of deformation even when the sheet has been heated to render it plastic.

After the clamp 14 is attached to the sheet 18 the clamp is mounted on the overhead support 16 by engaging the eyelets 104 on the upstanding flanges 102 of the clamp jaws 80 on the depending hooks 78 of the carriage 74 that rides along the monorail 58. Alternatively, the sheet may be attached to the clamp while the clamp is mounted on the overhead support, although it is probably easier to attach the clamp to the sheet independently and then hang the clamp from the overhead support.

With the clamp 14 attached to the overhead support 16 with a sheet 18 vertically suspended therefrom, the clamp and sheet are advanced along the monorail 58 into the heating component or oven 22. The clamp and sheet advance lengthwise and are suspended lengthwise within the oven, thus occupying no more widthwise space in the oven than the thickness of the monorail, and thereby permitting a long narrow oven construction wherein the hollow side walls 30 may be closely spaced for efficient and adequate heating. In the embodiment illustrated the narrow oven construction will accommodate five monorails 58 for support therein of five parallel sheets of material.

Prior to insertion of the sheets 18 into the oven 22 the oven switch 48 is turned on and the thermostat 46 is set to a desired oven temperature. When the preheat light 52 goes off and the light 54 indicating proper oven temperature goes on, the oven is ready to receive sheets 18. The timer 50 may be set to indicate a desired time of heating, although in most instances a longer heating time is not detrimental beacuse of the controlled temperature in the oven.

After a sheet 18 has remained in the oven a period sufficient to insure heating to a temperature that renders the sheet material plastic for molding, the sheet 18 and associated clamp 14 are retracted from the oven 22 along the monorail 58 of the overhead support 16, and the clamp 14 is removed from the overhead support 16 by disengaging the eyelets 104 on the clamps from the hooks 78 of the monorail carriage 74 while the sheet 18 remains in vertical suspended disposition from the clamp 14.

The sheet is now ready to be positioned on the mold component 24, which is in an advanced sheet receiving position adjacent the oven 22 and overhead support 16 with the platform 108 pivoted to its position of substantial inclination for positioning the mold face 26 of the mold unit 110 at a substantial inclination for receipt of the sheet 18 (see FIG. 2). This receiving position of the mold component 24 adjacent the oven 22 and overhead support 16 facilitates handling of sheets from the overhead support 16 to the mold component 24 and also minimizes the time of handling so that the sheets do not cool to a temperature at which they cannot be properly molded.

The sheet 18, which has been rendered plastic by the temperature of the oven and therefore is readily deformable is simply placed over the substantially inclined mold face 26 without danger of deformation and without handling of the sheet itself, by placing the clamp 14 from which the sheet is suspended along the top of the mold face 26 so that the suspended sheet lays over the mold face.

The mold component 24 is then retracted to an operating or molding position away from the overhead support 16 to permit operators to move around the mold component without interfering with other sheets suspended from the overhead support 16.

When the mold component 24 is at its operating position the platform 108 is pivoted to a horizontal position with the hook member 132 latched under the stop rod 134 to latch the platform 108 in its horizontal position. The clamp 14 is then removed from the sheet, which is now in a horizontal position over the horizontal mold face 26, and the clamping frame 168 is positioned over the periphery of the sheet 18. The toggle clamps 170 are then attached to clamp the clamping frame 168 and flat support member 146 of the mold unit 110 together with the sheet 18 therebetween.

The mold is then operated by opening the vacuum valve 162, causing a vacuum to be drawn through the flexible conduit 158 and attaching conduit 156, with the result that a vacuum is also drawn in the vacuum chamber 150. This vacuum, acting through the perforations 152 in the mold face 26, draws the plastic sheet 18 down into close conformation with the surface of the mold face and contoured in accordance with any mold pieces 164 that are attached to the mold face.

As the sheet 18 is being formed on the mold face 142 it cools to a rigid state in a very short time and the complete rigid sheet formed to the desired contour is easily removed simply by releasing the toggle clamps 170 and removing the clamping frame 168, permitting the formed sheet to be raised away from the mold face in the form of a contoured article.

The above described operating procedure may be a continuous process in which a number of sheets are maintained in the oven for heating to a plastic temperature while one sheet is removed and formed. Thus a plastic sheet will be immediately available for forming as soon as forming of the previous sheet has been completed on the mold component 24. To further expedite the production, a second mold component could be operated on the opposite side of the overhead support so that while a formed sheet is cooling on one mold component the operators can be placing another plastic sheet on the other mold component.

The method and means of the present invention are particularly adaptable for the production of contoured sign faces from sheets of material such as Plexiglas, Uvex, butyrate plastic and other similar materials. Using 1/8" Plexiglas in an oven heated to approximately 350° F. the sheet material will be at a proper molding temperature in about 12½ minutes. The sheet can then be removed from the oven, formed on the mold component, allowed to cool and removed from the mold all within about 6 minutes. As a result, two operators can process as many as 100 or more sheets in an 8 hour shift.

At the end of a run using one mold face, a differently contoured mold face can be readily substituted simply by disconnecting the conduit 156 of the mold unit 110 from the flexible conduit 158 leading to the vacuum tank 160, and a new mold unit mounted in place of the old unit with the flexible conduit attached to the conduit of the new mold unit.

The present invention has been described in detail above for purposes of illustration only and is not intended to be limited by this description or otherwise except as defined in the appended claims.

I claim:

1. A method of vacuum molding a contoured article from a sheet of material that becomes plastic when heated, said method comprising suspending said sheet vertically, heating said suspended sheet to render it plastic, placing said plastic sheet while still vertically suspended over a substantially vertical perforated mold face, displacing said mold face to a generally horizontal position, while maintaining said plastic sheet thereon, drawing a vacuum below said perforated mold face to draw said plastic sheet to the contour of the mold face while allowing said sheet to cool to a rigid state, and removing the rigid sheet from the mold face as a contoured article.

2. Means for molding a contoured article comprising a base having an elevated supporting element, a platform pivotally mounted intermediate its ends along said elevated supporting element and extending therebeyond for pivoting between horizontal and substantially vertical dispositions with a raised portion along the end thereof that is lowermost when the platform is in inclined disposition, a mold unit removably mountable on said platform and engageable against said raised portion to retain said mold unit on said platform when the platform is inclined, said mold unit having a perforated mold face for receipt thereover of a sheet of material to be molded when the mold unit is substantially vertical, latching means for latching said platform in horizontal disposition, and means for drawing a vacuum below said perforated mold face to draw said plastic sheet for forming said sheet to the contour of the mold face during horizontal disposition of said platform, mold unit and sheet.

3. Means for molding a contoured article from a sheet of material that becomes plastic when heated, said means comprising a sheet supporting component engageable with an edge of said sheet for vertical suspension of said sheet therefrom with said edge uppermost, a heating component in which said sheet supporting component is positionable for heating of the sheet suspended from said supporting component to render said sheet plastic, and a mold component adjacent said heating component, said mold component having a base, a platform pivotally supported on said base, and a perforated mold face carried on said platform adjacent said heating component, said platform being pivotable between a substantially vertical position for positioning said mold face substantially vertical to receive said sheet supporting component along the top thereof with said sheet vertically suspended therefrom over said mold face and a horizontal position for positioning said sheet and mold face horizontally, and means for drawing a vacuum below said perforated mold face when in horizontal position to draw said plastic sheet for forming to the mold contour while the sheet cools to a rigid state.

References Cited by the Examiner
UNITED STATES PATENTS

| | | | |
|---|---|---|---|
| 1,154,256 | 9/15 | Lanhoffer | 18—56 |
| 2,711,560 | 6/55 | Beckham | 18—19 |
| 2,885,732 | 5/59 | Kazmaier et al. | 18—56 |
| 3,041,669 | 7/62 | Marshall et al. | |

OTHER REFERENCES

Plexiglas Fabricating Manual, pages 13 to 21, Rohm & Haas Co., August 1944.

ROBERT F. WHITE, *Primary Examiner.*

MORRIS LIEBMAN, ALEXANDER H. BRODMERKEL, *Examiners.*